(12) United States Patent
Nicholson (10) Patent No.: US 11,143,861 B2
(45) Date of Patent: Oct. 12, 2021

(54) SYSTEMS, DEVICES, AND METHODS FOR LASER PROJECTION IN WEARABLE HEADS-UP DISPLAYS

(71) Applicant: GOOGLE LLC, Mountain View, CA (US)

(72) Inventor: Stuart James Myron Nicholson, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/508,850

(22) Filed: Jul. 11, 2019

(65) Prior Publication Data

US 2020/0026069 A1 Jan. 23, 2020

Related U.S. Application Data

(60) Provisional application No. 62/699,492, filed on Jul. 17, 2018.

(51) Int. Cl.
*G02B 26/10* (2006.01)
*G09G 3/02* (2006.01)
*G02B 27/01* (2006.01)

(52) U.S. Cl.
CPC ............... *G02B 26/10* (2013.01); *G09G 3/02* (2013.01); *G02B 2027/0174* (2013.01); *G02B 2027/0178* (2013.01); *G02B 2027/0187* (2013.01)

(58) Field of Classification Search
CPC ................................ G09G 3/02; G09G 5/003
See application file for complete search history.

(56) References Cited

U.S. PATENT DOCUMENTS

| | | | |
|---|---|---|---|
| 2006/0268241 A1* | 11/2006 | Watson | G03B 21/2033 353/94 |
| 2009/0185258 A1* | 7/2009 | Shirai | G02B 26/0841 359/292 |
| 2012/0223973 A1* | 9/2012 | Uehara | G09G 3/3413 345/690 |
| 2014/0145913 A1* | 5/2014 | Tanahashi | G03B 21/147 345/7 |
| 2014/0240611 A1* | 8/2014 | Kimura | G02B 27/48 348/750 |
| 2016/0238845 A1* | 8/2016 | Alexander | G03H 1/2645 |
| 2016/0301905 A1* | 10/2016 | Asada | H04N 9/3194 |
| 2017/0353628 A1* | 12/2017 | Kishigami | G09G 3/20 |

* cited by examiner

*Primary Examiner* — Md Saiful A Siddiqui (57) ABSTRACT

There is provided a wearable heads-up display (WHUD) having a laser projector to generate a display image. The display image can have a pixel having a pixel on-time. Furthermore, the laser projector can have a laser diode to emit laser light. The WHUD can also include a controller communicatively coupled to the laser diode. The controller can modulate the laser diode during the pixel on-time to be off during a laser off-time of the pixel on-time and on during a laser on-time of the pixel on-time. Moreover, the WHUD can include a holographic optical element to receive the laser light from the laser projector and redirect the laser light towards an eye of a user of the WHUD.

20 Claims, 6 Drawing Sheets

SYSTEMS, DEVICES, AND METHODS FOR LASER PROJECTION IN WEARABLE HEADS-UP DISPLAYS

FIELD

The present systems, devices, and methods relate generally to wearable heads-up displays, and particularly to wearable heads-up displays having laser projectors.

BACKGROUND

A head-mounted display is an electronic device that is worn on a user's head and, when so worn, secures at least one electronic display within a viewable field of at least one of the user's eyes, regardless of the position or orientation of the user's head. A wearable heads-up display ("WHUD") is a head-mounted display that enables the user to see displayed content but also does not prevent the user from being able to see their external environment. The "display" component of a WHUD is either transparent or at a periphery of the user's field of view so that it does not completely block the user from being able to see their external environment. Examples of WHUDs include: the Google Glass®, the Optinvent Ora®, the Epson Moverio®, and the Sony Glasstron®, just to name a few.

The display image formed by the WHUD can be generated by a projector. A projector is an optical device that projects or shines a pattern of light onto another object (e.g., onto a surface of another object, such as onto a projection screen) in order to display an image or video. A projector necessarily includes a light source, and a laser projector is a projector for which the light source comprises at least one laser. The laser is temporally modulated to provide a pattern of laser light and usually at least one controllable mirror is used to spatially distribute the modulated pattern of laser light over a two-dimensional area. The spatial distribution of the modulated pattern of laser light over the two-dimensional area produces an image. In conventional laser projectors, the controllable mirror may include: a single digital micromirror (e.g., a microelectromechanical system ("MEMS") based digital micromirror) that is controllably rotatable or deformable in two dimensions, or two digital micromirrors that are each controllably tiltable, rotatable, or deformable about a respective dimension, or a digital light processing ("DLP") chip comprising an array of digital micromirrors.

A laser projector can comprise a RGB laser module with a red laser diode, a green laser diode, and a blue laser diode. The laser diodes can be optically coupled to additional optical elements, such as lenses, to further condition the laser light emitted by the diodes. The optical performance of a WHUD and its laser projector is an important factor in the design of the heads-up display.

BRIEF SUMMARY

A wearable heads-up display may be summarized as including: a laser projector to generate a display image comprising a pixel having a pixel on-time, the laser projector comprising a laser diode to emit laser light; a controller communicatively coupled to the laser diode, the controller communicatively coupled and operable to modulate the laser diode during the pixel on-time to be off during a laser off-time of the pixel on-time and on during a laser on-time of the pixel on-time; and a holographic optical element to receive the laser light from the laser projector and redirect the laser light towards an eye of a user of the wearable heads-up display.

The controller may be further operable to control the laser diode to emit laser light at an increased intensity during the laser on-time, the increased intensity greater than a baseline intensity of the laser diode. A total increased power deliverable by the laser diode during the laser on-time may be about equal to a total baseline power deliverable by the laser diode during the pixel on-time. The controller may be further operable to cycle the laser diode between being on and being off at least twice during the pixel on-time.

The controller may be further communicatively coupled and operable to receive a measure of an angle of the laser light redirected by the holographic optical element. The wearable heads-up display may include a detector to detect the angle of the laser light redirected by the holographic optical element. The controller may be further operable to increase the laser off-time if the angle deviates from a target angle.

The controller may be further communicatively coupled and operable to receive a measure of a wavelength of the laser light emitted by the laser diode. The wearable heads-up display may include a detector to detect the wavelength of the laser light emitted by the laser diode. The controller may be further operable to increase the laser off-time if the wavelength deviates from a target wavelength.

The wearable heads-up display may be or include glasses. The holographic optical element may be disposed on or in a lens of the glasses.

The laser projector may be or include a scanning laser projector. The scanning laser projector may include a red laser diode, a green laser diode, and a blue laser diode. The scanning laser projector may include a movable scan mirror to direct the laser light towards the holographic optical element. The controller may be further operable to position the scan mirror to direct the laser light towards a region of the holographic optical element corresponding to the pixel for a duration of the pixel on-time. Moreover, the pixel on-time may correspond to a time taken for the scan mirror to undergo an angular movement corresponding to a spatial dimension of the pixel.

A method of operating a wearable heads-up display may be summarized as including: emitting laser light by a laser diode, the laser light to generate a display image comprising a pixel having a pixel on-time; receiving the laser light from the laser diode by a holographic optical element, the holographic optical element to redirect the laser light towards an eye of a user of the wearable heads-up display; and modulating, by a controller communicatively coupled to the laser diode, the laser diode during the pixel on-time to be off during a laser off-time of the pixel on-time and on during a laser on-time of the pixel on-time. The laser light may be emitted by the laser diode at an increased intensity during the laser on-time, the increased intensity greater than a baseline intensity of the laser diode. The laser diode may deliver a total increased power during the laser on-time that is about equal to a total baseline power deliverable by the laser diode during the pixel on-time.

The method may further include: detecting, by an angle detector, an angle of the laser light redirected by the holographic optical element; and increasing the laser off-time if the angle deviates from a target angle.

The method may further include: detecting, by a wavelength detector, a wavelength of the laser light emitted by the laser diode; and increasing the laser off-time if the wavelength deviates from a target wavelength.

The method may further include receiving the laser light from the laser diode at a movable scan mirror operable to direct the laser light towards the holographic optical element. The pixel on-time may correspond to a time taken for the scan mirror to undergo an angular movement corresponding to a spatial dimension of the pixel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations and embodiments.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Figure 1:
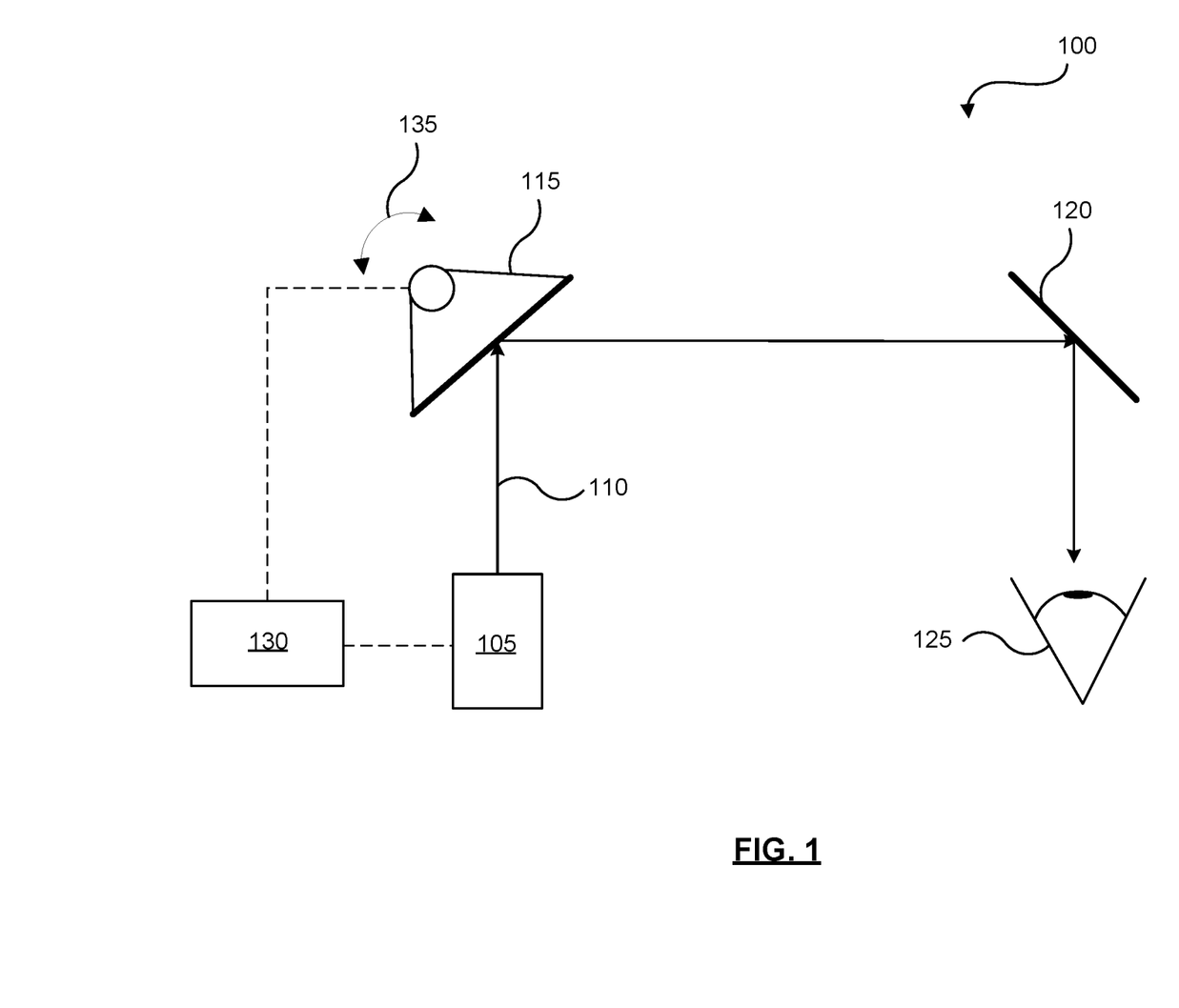
FIG. 1 shows a schematic representation of an example WHUD in accordance with an implementation of the present systems, devices, and methods.

FIG. 1 shows a schematic representation of an example WHUD 100, comprising a laser projector having a laser diode 105, which generates a beam of laser light 110. Laser light 110, in turn, reflected by a controllable scan mirror 115 towards projection surface 120. In some implementations, projection surface 120 can comprise a holographic optical element, which is described in greater detail below. Projection surface 120, in turn, redirects laser light 110 towards an eye 125 of a user of the WHUD 100.

Laser diode 105 and scan mirror 115 can be communicatively coupled to a controller 130. Controller 130 controls laser diode 105 and scan mirror 115 to form a display image having n pixels, where n is a natural number equal to or greater than one. The display image can have a frame rate or refresh rate r expressed respectively as the number of frames displayed per second or the number of refresh cycles per second. As such, the duration of time for each frame or refresh cycle can be expressed at 1/r seconds, and the time duration for each pixel, in turn, can be expressed as pixel time t=1/nr seconds.

Depending on the contents of a given pixel, e.g., whether the pixel is to appear light or dark in the display image, controller 130 modulates laser diode 105 to turn laser diode 105 on or off for the duration of pixel time t for that given pixel. Controller 130 also controls scan mirror 115 to direct laser light 110 to the region of projection surface 120 corresponding to the given pixel for the duration of pixel time t. After time t, controller 130 modulates laser diode 105 and positions scan mirror 115 to form the next pixel, also for duration of time t, and so on for the remaining pixels forming the display image.

For example, controller 130 can tilt scan mirror 115 about one axis as shown by arrow 135. In some implementations, scan mirror 115 can also be tiltable about a second independent axis. In other implementations, not shown, WHUD 100 can comprise a second scan mirror tiltable about an axis different than the tilt axis of scan mirror 115. To form the display image, controller 130 can control the tilting of scan mirror 115, and other scan mirrors if present, to raster scan laser light 110 across projection surface 120, while simultaneously modulating laser diode 105. The combination of laser diode 105 and scan mirror 115 can form part of a scanning laser projector (SLP).

If the contents of a display image indicate that a given pixel is to be light, i.e., laser diode 105 is to be on, then pixel time duration t can be referred to as the pixel on-time for the given pixel.

Pixel on-time can also be described in terms of the movements of scan mirror 115 and modulations of laser diode 105. Pixel on-time can represent the time it takes for scan mirror 115 to undergo the angular movement corresponding to the spatial dimension(s) of one pixel (e.g., length, height, diameter), while the contents of the image being displayed indicate that the pixel is to be light. In accordance with the present systems, methods, and devices and as described below in relation to FIGS. 3 and 4, laser diode 105 can be modulated by turning laser diode 105 on and off during the pixel on-time.

Figure 2:
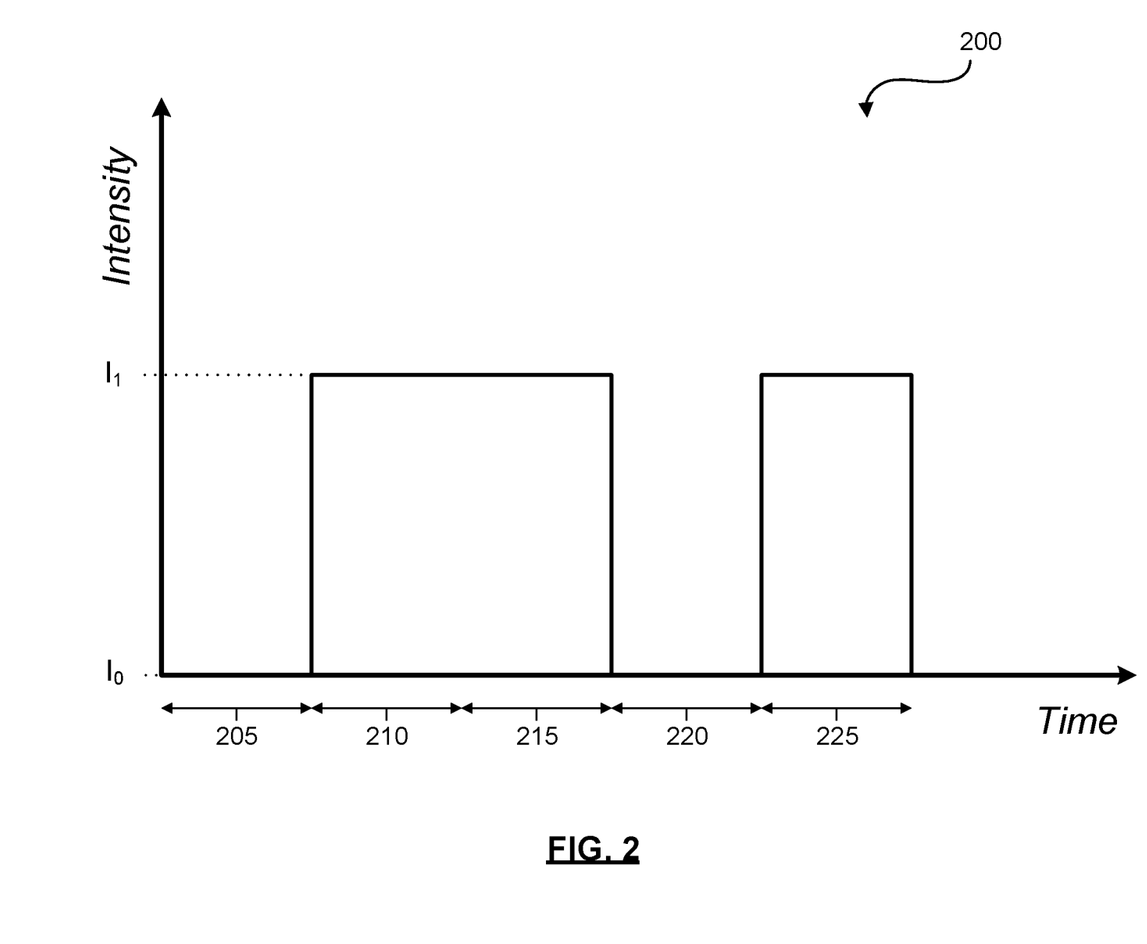
FIG. 2 shows an example graph of intensity of laser light versus time in accordance with an implementation of the present systems, devices, and methods.

FIG. 2 shows an example graph 200 of intensity of laser light versus time for laser diode 105. Graph 200 shows modulations of laser diode 105 for five pixels having corresponding successive pixel times 205, 210, 215, 220, and 225. Graph 200 shows that during pixel time 205 the intensity of laser light is at $I_0$, i.e., the laser diode is off and the pixel in question is dark. For the next pixel, during pixel time 210, the intensity of laser light is at $I_1$, i.e., the laser diode is on and the pixel in question is light. Similarly, the laser diode is on during pixel time 215, off during pixel time 220, and on again during pixel time 225. Pixel times 210, 215, and 225, when laser diode 105 is on, can individually be described as pixel on-times.

The qualities or characteristics of laser light 110 can change over time during the pixel on-time. For example, due to mode hopping, the wavelength of laser light 110 can change over time during the pixel on-times. The likelihood and/or the extent of this change can be a function of the amount of time that laser diode 105 has been on. In particular, the longer laser diode 105 is on continuously and/or the shorter the laser-off periods between the successive laser-on periods, the higher the likelihood can be of mode hopping.

Mode hopping can degrade the quality of the projected display image. In implementations where projection surface 120 comprises a holographic optical element, even a small shift in the wavelength of laser light 110 can cause a change in the angle at which laser light 110 is redirected by projection surface 120 towards eye 125. These shifts in wavelength can be as small as 1-2 nm. Such changes in the redirected light angle can be detectable by the eye 125 of the wearer of WHUD 100 as deformations of projected lines or as color misalignments (in implementations where the laser projector of the WHUD has multiple laser diodes of different colors) in the display image.

Figure 3:
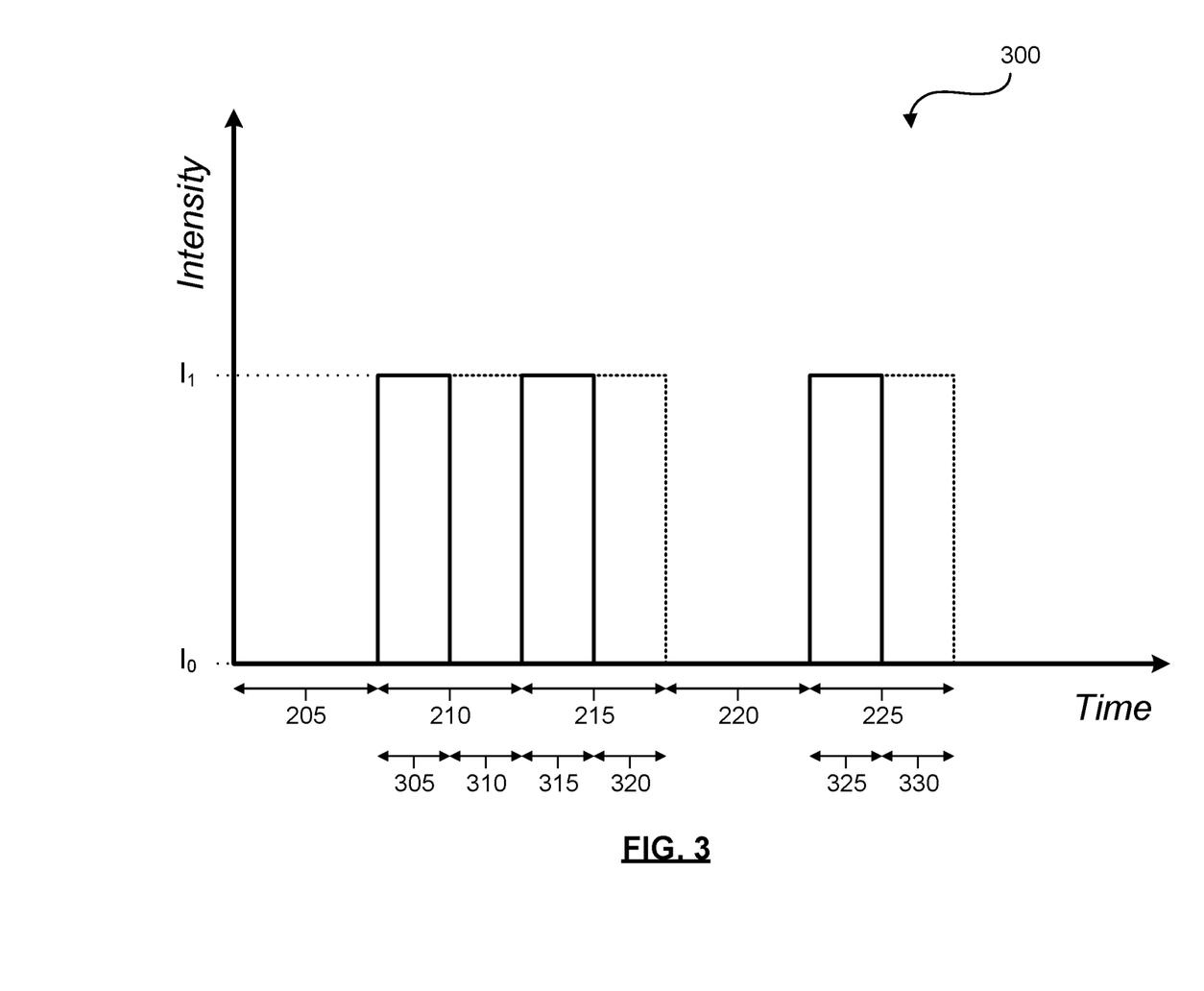
FIG. 3 shows another example graph of intensity of laser light versus time in accordance with an implementation of the present systems, devices, and methods.

To reduce the likelihood of changes to the laser light, such as wavelength shifts due to mode hopping, controller 130 can further modulate laser diode 105 to keep off or turn off laser light 110 during a portion of a pixel on-time. This can reduce the likelihood of mode hopping by shortening the laser on-time. FIG. 3 shows an example graph 300 of intensity of laser light versus time for laser diode 105. Compared to graph 200, graph 300 shows a different pattern of modulations of laser diode 105 for three of the five pixels having corresponding pixel times 210, 215, and 225. As shown in FIG. 3, during pixel time 205 the laser diode is off, so no changes are needed to reduce laser on-time between graphs 200 and 300. Similarly, no changes are made to the laser diode during pixel time 220 between graphs 200 and 300.

During pixel time 210, the laser diode is modulated by controller 130 to be on during a laser on-time 305 and to be off during a laser off-time 310. Laser on-time 305 and laser off-time 310 are portions of and within pixel on-time 210. In this manner, the total on-time of the laser diode during pixel on-time 210 can be reduced from the longer pixel on-time 210 to the shorter laser on-time 305.

A similar pattern of modulation of the laser diode can be applied to pixel on-times 215 and 225. During pixel on-time 215, the laser diode can be modulated to be on during laser on-time 315 and off during laser off-time 320. Similarly, during pixel on-time 225, the laser diode can be modulated to be on during laser on-time 325 and off during laser off-time 330.

Graph 300 also shows the laser diode modulation pattern of graph 200 in dashed lines, for comparison. By comparing the modulation pattern of graph 300 shown in solid lines with the dashed modulation pattern, it can be seen that in graph 300 laser on-time has been reduced by modulating the laser diode to be off during a laser off-time portion of each of the pixel on-times.

While graph 300 shows only one on-off cycle per pixel on-time, it is contemplated that the laser diode can be cycled two or more times per pixel time. Moreover, the cycling or modulating of the laser diode need not apply to all pixel on-times, and can apply to a subset of the pixel on-times.

Moreover, graph 300 shows the on-off cycles per pixel on-time as square waves. It is contemplated that the on-off cycling can have a different suitable shape, such a sinusoidal shape, and the like. In general, the shape, pattern, or number of on-off cycles per pixel-on time is not intended to be limiting, and can comprise a shape, pattern, or number of on-off cycles that can reduce the laser on-time per pixel on-time, thereby reducing the likelihood of mode hopping. Moreover, in some implementations the shape, pattern, or number of on-off cycles per pixel on-time need not be the same for all pixel on-times and can change from one pixel time to another.

In addition, the pattern of off and on (i.e., dark and light) pixels as a function of times shown in graphs 200 and 300 is intended as an illustrative example. The pattern can be different than shown in graphs 200 and 300 based on the content of the image being displayed.

As described herein, according to an implementation of the present systems, devices, and methods there is provided a WHUD 100 comprising a laser projector to generate a display image comprising at least one pixel having a pixel on-time. The laser projector comprises laser diode 105 to emit laser light 110. The WHUD also comprises a controller 130 communicatively coupled to laser diode 105. Controller 130 can modulate laser diode 105 during the pixel on-time to be off during a laser off-time portion of the pixel on-time and on during a laser on-time portion of the pixel on-time. The WHUD also comprises a holographic optical element to receive laser light 110 from the laser projector and redirect laser light 110 towards an eye 125 of a user of the WHUD.

Turning again to FIG. 3, in graph 300 the intensity or power delivered for each of the pixel on-times 210, 215, and 225 is reduced (e.g., halved) relative to the corresponding pixel on-times in graph 200 of FIG. 2 because, in FIG. 3, the laser diode is on during only the laser on-time portions 305, 315, and 325 of the pixel on-times respectively and off during the laser off-time portions 310, 320, and 330 of the pixel on-times respectively. To mitigate this reduction in intensity or power, in some implementations the controller can control the laser diode to emit the laser light at an increased intensity or power during or over the laser on-times.

This increased intensity can be greater than a baseline intensity of the laser diode. For example, the baseline intensity can be the intensity of the laser diode when the laser on-time is equal to the pixel on-time, such that the laser diode is not turned off during a portion of the pixel on-time. For example, in graphs 200 and 300 the baseline intensity can be indicated by $I_1$. Intensity per unit time can provide a measure of power, and as such the discussions of baseline and increased intensity can also be expressed in terms of baseline and increased power respectively.

Figure 4:
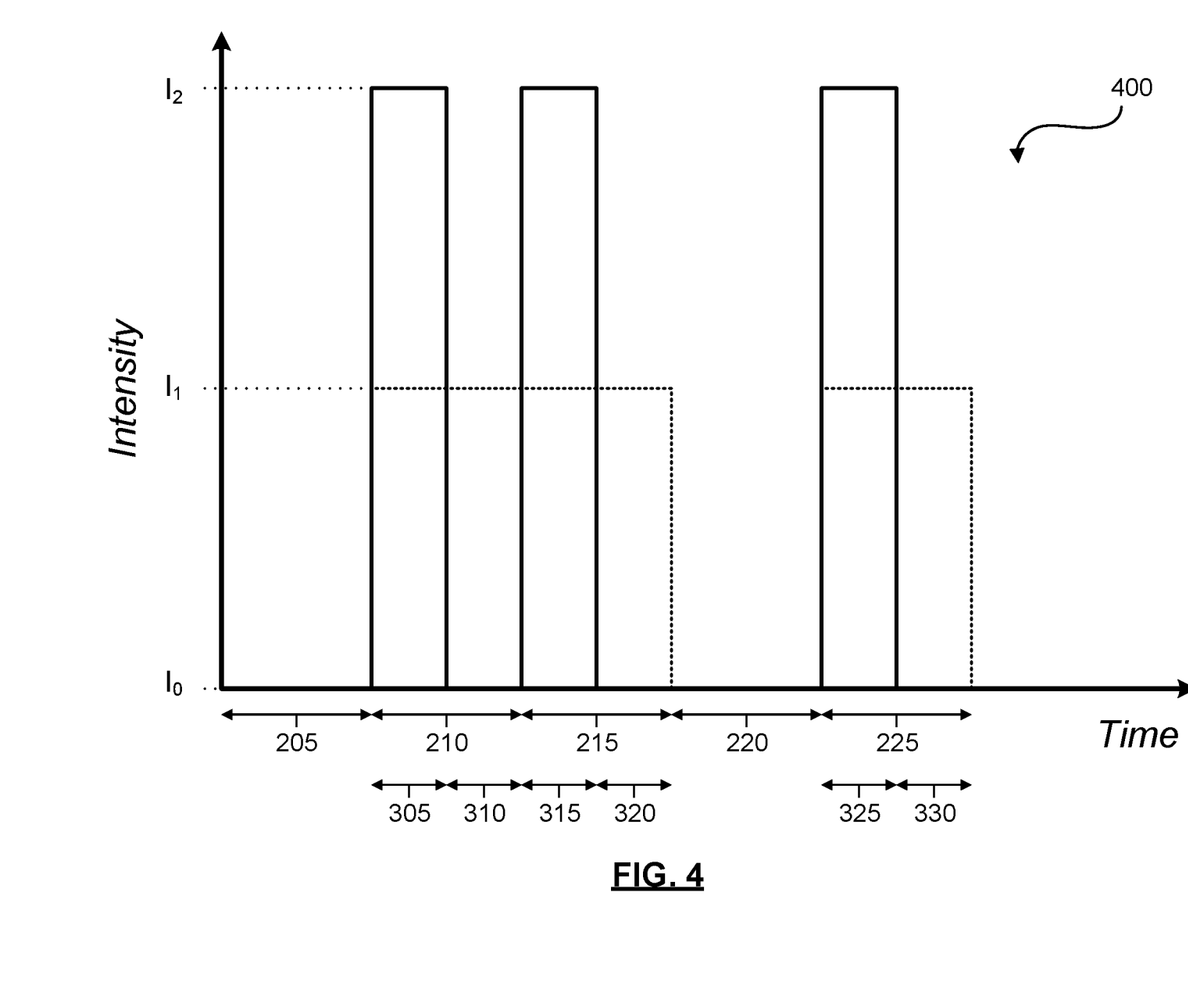
FIG. 4 shows another example graph of intensity of laser light versus time in accordance with an implementation of the present systems, devices, and methods.

FIG. 4 shows an example graph 400 of intensity of laser light versus time for exemplary laser diode 105. Graph 400 is similar to graph 300, with the exception that in graph 400 the controller controls the laser diode to emit the laser light at an intensity $I_2$ during laser on-times 305, 315, and 325, which intensity $I_2$ is greater than baseline intensity $I_1$.

If the increased intensity $I_2$ is sufficiently greater than the baseline intensity $I_1$, the total power delivered by the laser diode during the laser on-time can be set to be equal to or about equal to the total baseline power deliverable by the laser diode during the pixel on-time. The total power delivered or deliverable over time for a given pixel on-time can also be defined as the area under the intensity versus time curve for the given pixel on-time.

Taking pixel on-time 210 as an example, if the laser on-time 305 is half of the pixel on-time 210, setting intensity $I_2$ to be twice baseline intensity $I_1$ can cause the total increased power delivered by the laser diode during laser on-time 305 portion of pixel on-time 210 to be the same as the total baseline power that would have been deliverable had the laser diode been on during the full pixel on-time 210 at its baseline intensity $I_1$.

The matching of the total increased power deliverable during the laser on-time with the total baseline power deliverable during the pixel on-time can reduce the likelihood of the wearer of the WHUD detecting a reduction in brightness or contrast of the display image as a result of the controller turning off the laser diode during the laser off-time portion of the pixel on-time.

In some implementations, the controller can also receive a measure or indication of an angle of the laser light redirected from the projection surface such as the holographic optical element. As discussed above, the angle of the laser light redirected from the holographic optical element can be a function of the wavelength of the laser light, and can change if there are shifts in the wavelength due, for example, to mode hopping. As such, detecting changes in the angle of the redirected laser light can act as a method of detecting the onset of wavelength changes in the laser light, for example due to mode hopping in the laser diode.

Moreover, in some implementations the WHUD can also comprise a detector communicatively coupled to the controller, the detector to detect the angle of the laser light redirected by the holographic optical element. This detector can also be referred to as an angle detector. If the detected angle deviates from a target angle, onset of mode hopping can be detected. In response, the controller can modulate the laser diode to increase the laser off-time portion of the pixel on-times. This increase in the laser off-time can help reverse the shifts to the wavelength of the laser light, reset the laser diode, and/or prevent the wavelength shifts from further increasing. In some implementations, the laser off-time can be increased sufficiently to allow the laser diode to reset to its original mode and, upon turning back on, emit laser light at its original, unshifted wavelength. In some implementations, it may be desirable to at least approximately keep constant the total power delivered by the laser diode during the pixel on-time as discussed above, and therefore when the controller increases the laser off-time in response to a detected change in the angle of the laser light redirected by the holographic optical element the controller may also increase the laser intensity during the laser on-time by a proportionate amount.

In some implementations, the controller can receive a measure or indication of the wavelength of the laser light emitted by the laser diode. Monitoring the wavelength of the laser light can allow for detecting shifts in the wavelength due, for example, to mode hopping.

Furthermore, in some implementations the WHUD can also comprise a detector communicatively coupled to the controller, the detector to detect the wavelength of the laser light emitted by the laser diode. This detector can also be referred to as a wavelength detector. If the detected wavelength deviates from a target wavelength, the onset of mode hopping can be detected. In some examples, the target wavelength can comprise a target wavelength range. The target wavelength or wavelength range can correspond to or be centered around the original or unshifted wavelength of the laser diode.

In response to detecting a wavelength shift, the controller can modulate the laser diode to increase the laser off-time portion of the pixel on-times. This increase in the laser off-time can help reverse the shifts to the wavelength of the laser light, reset the laser diode, or prevent the wavelength shifts from increasing further. In some implementations, the laser off-time can be increased sufficiently to allow the laser diode to reset to its original mode and, upon turning back on, emit laser light at its original, unshifted wavelength. In some implementations, it may be desirable to at least approximately keep constant the total power delivered by the laser diode during the pixel on-time as discussed above, and therefore when the controller increases the laser off-time in response to a detected change in the wavelength of the laser light the controller may also increase the laser intensity during the laser on-time by a proportionate amount.

FIG. 1 shows an example WHUD 100, and changes and variations to WHUD 100 are contemplated. Some example variations will be discussed below, but these examples are not intended to be exhaustive or to limit the possible variations. For example, in some implementations the path of laser light 110 from laser diode 105 to eye 125 of the wearer can be different than that shown in FIG. 1. In these implementations the optical elements in the light path can be ordered or arranged differently, or different or additional optical elements can be present in the light path.

In some implementations, the laser projector can comprise additional laser diodes. For example, the laser projector can comprise red, green, and blue laser diodes. Each of these different color light beams may be combined into a single aggregate beam that may be incident upon a corresponding spatial modulator such as a scan mirror.

In some implementations the WHUD can comprise a light source other than a laser projector or the light beam used to generate the display image can be different than a laser light beam. In other words, the systems, devices, and methods described herein may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). While mode hopping occurs in laser light sources, non-laser projectors may also benefit from reductions in light source on-times that can be achieved by implementing the light source modulations described herein in relation to FIGS. 3 and 4.

Such non-laser implementations may advantageously employ additional optics to collimate, focus, and/or otherwise direct projected light signals. Unless the specific context requires otherwise, references to a laser projector or "SLP" throughout the present systems, devices, and methods are generic to other light sources (combined with other optics, as necessary) that may be applied or adapted for application to accomplish the same general function(s) associated with the SLPs described herein.

Moreover, in some implementations the projection surface can be different than a holographic optical element. The systems, devices, and methods described herein may be applied or otherwise incorporated into WHUD architectures that employ one or more transparent combiner(s) other than a holographic optical element. For example, in some implementations the holographic combiner described herein may be replaced by a non-holographic device that accomplishes substantially the same general function(s), such as a prismatic film, a film that carries a microlens array, or a waveguide structure. Such non-holographic implementations may or may not employ additional optics. Unless the specific context requires otherwise, the references to a "holographic combiner" throughout the present systems, devices, and methods are generic to other transparent combiners (combined with other optics, as necessary) that may be applied or adapted for application to accomplish the same general function(s) associated with the holographic combiners described herein.

In addition, in some implementations, the controller can comprise a processor in communication with a non-transitory processor-readable medium. The processor-readable medium can comprise instructions to cause the processor to control or modulate the laser diode as described in relation to FIGS. 3 and 4. Moreover, in some implementations the controller can be incorporated in or a component of the laser projector, while in other implementations the controller can be separate from the laser projector. Furthermore, in some implementations the controller may be external to the WHUD and in wired or wireless communication with the light source, e.g., the laser diodes, and with the spatial light modulator such as the scan mirror.

Figure 5:
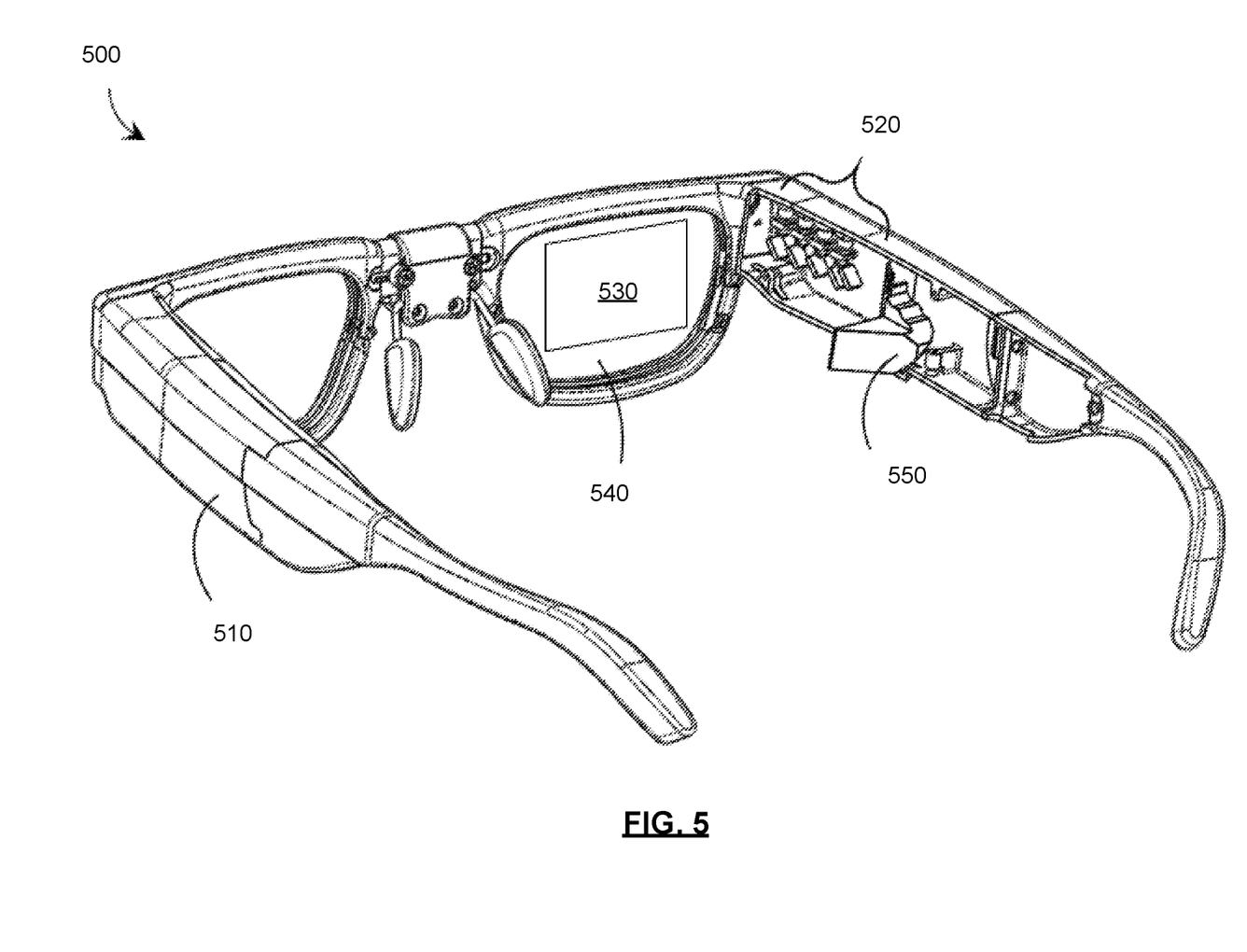
FIG. 5 shows a partial-cutaway perspective view of another example WHUD in accordance with an implementation of the present systems, devices, and methods.

Turning now to FIG. 5, a partial-cutaway perspective view of another example WHUD 500 is shown. WHUD 500 includes a support structure 510 that in use is worn on the head of a user and has a general shape and appearance of an eyeglasses (e.g., sunglasses) frame. Eyeglasses or sunglasses can also be generically referred to as "glasses". Support structure 510 carries multiple components, including: a SLP 520, a holographic combiner 530, and an optical splitter 550. Portions of SLP 520 and optical splitter 550 may be contained within an inner volume of support structure 510; however, FIG. 1 provides a partial-cutaway view in which regions of support structure 510 have been removed in order to render visible portions of SLP 520 and optical splitter 550 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 520 can include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 520 may be communicatively coupled to (and support structure 510 may further carry) a processor and a non-transitory processor-readable storage medium or memory storing processor-executable data and/or instructions that, when executed by the processor, cause the processor to control the operation of SLP 520. For ease of illustration, FIG. 5 does not call out a processor or a memory. SLP 520 can provide laser diodes and spatial light modulators similar to laser diode 105 and scan mirror 115 of WHUD 100 respectively.

Holographic combiner 530 is positioned within a field of view of at least one eye of the user when support structure 510 is worn on the head of the user. Holographic combiner 530 is sufficiently optically transparent to permit light from the user's environment (i.e., "environmental light") to pass through to the user's eye. In the illustrated example of FIG. 5, support structure 510 further carries a transparent eyeglass lens 540 (e.g., a prescription eyeglass lens) and holographic combiner 530 comprises at least one layer of holographic material that is adhered to, affixed to, laminated with, disposed on or in, carried in or upon, or otherwise integrated with eyeglass lens 540. Holographic combiner 530 can provide a projection surface similar to projection surface 120 of WHUD 100. Moreover, projection surface 120 can have a structure and/or function similar to those of holographic combiner 530.

The at least one layer of holographic material may include a photopolymer film such as Bayfol® HX available from Bayer MaterialScience AG or a silver halide compound and may, for example, be integrated with transparent lens 540 using any of the techniques described in US Patent Publication No. 2017-0068095. Holographic combiner 530 includes at least one hologram in or on the at least one layer of holographic material. With holographic combiner 530 positioned in a field of view of an eye of the user when support structure 510 is worn on the head of the user, the at least one hologram of holographic combiner 530 is positioned and oriented to redirect light originating from SLP 520 towards the eye of the user. In particular, the at least one hologram is positioned and oriented to receive light signals that originate from SLP 520 and converge those light signals at or proximate the eye of the user.

Optical splitter 550 is positioned in an optical path between SLP 520 and holographic combiner 530. Optical splitter 550 comprises at least one optical element (e.g., at least one lens, reflector, partial reflector, prism, diffractor, diffraction grating, mirror, or other optical element, or at least one configuration, combination, and/or arrangement of such) that is arranged to receive light signals generated and output by SLP 520 and redirect each such light signal towards holographic combiner 530.

In addition, WHUD 500 can also comprise a controller, not shown, to control SLP 520. In some implementations, the controller can be integrated into or a component of the SLP 520. This controller can perform similar functions as described herein in relation to controller 130. In particular, the controller in WHUD 500 can modulate the laser diodes in SLP 520 during the pixel on-time to be off during a laser off-time of the pixel on-time and on during a laser on-time of the pixel on-time, as described herein in relation to FIGS. 3 and 4.

In some implementations, WHUD 500 need not comprise optical splitter 550, and an optical element such as a reflector can direct the laser light from SLP 520 towards holographic combiner 530. Moreover, in some implementations the laser light from the SLP can be directly incident upon holographic combiner 530.

The various implementations for WHUDs described herein may be applied in non-WHUD applications. In particular, the manner of modulating the light source, e.g., laser diode, to be off during a light source off-time of the pixel on-time and on during a light source on-time of the pixel on-time can be implemented in non-WHUD applications. For example, the present systems, devices, and methods may be applied in non-wearable heads-up displays, displays, projectors, or other image-forming devices other than WHUDs, and/or in other applications that may include non-heads-up displays.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems.

Figure 6:
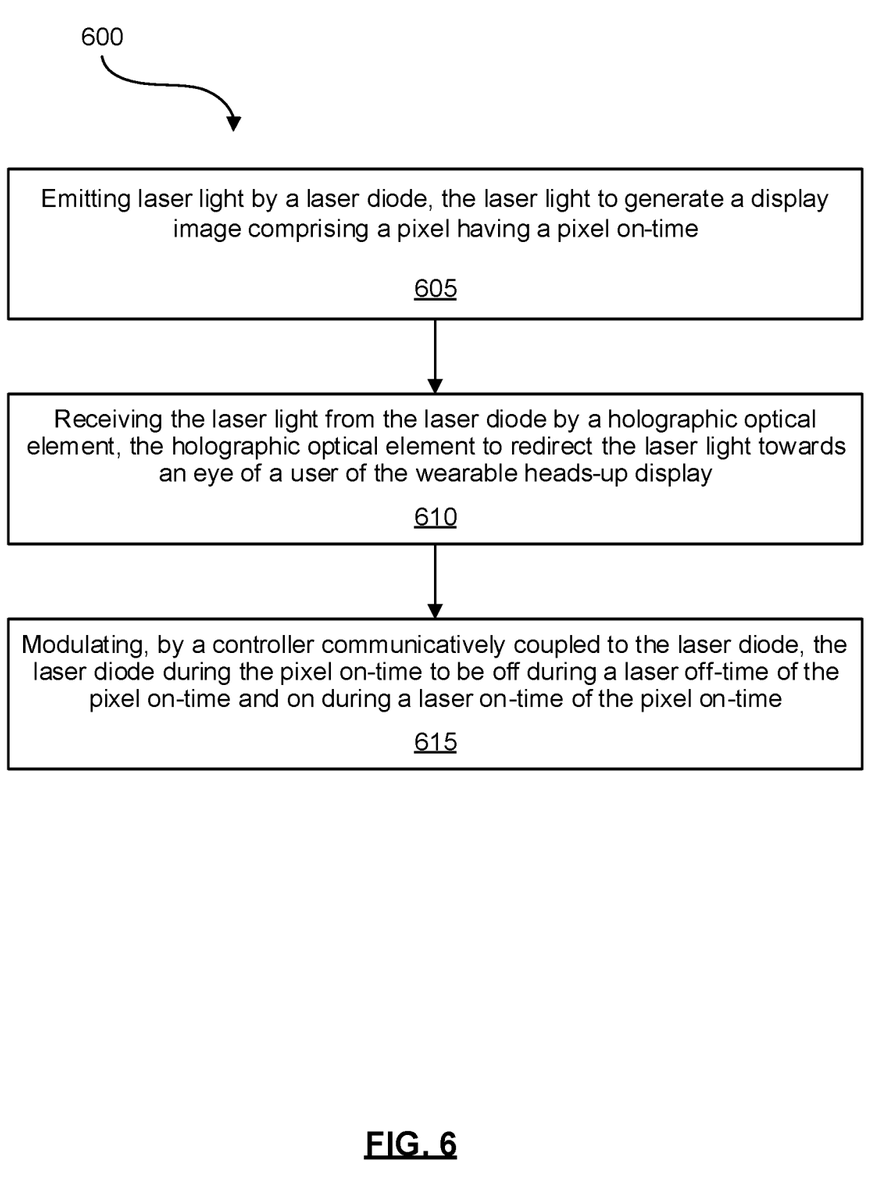
FIG. 6 shows a flowchart depicting an example method for operating a WHUD in accordance with an implementation of the present systems, devices, and methods.

Turning now to FIG. 6, a flowchart is depicted showing an example method 600 for operating a WHUD, such as the WHUDs described herein. Method 600 can reflect the operation of WHUDs 100 and 500 described above. At 605, laser light is emitted by a laser diode. Emission of laser light by the laser diode may be controlled by a controller carried by the WHUD and communicatively coupled to the laser diode. The laser light can be used to generate a display image having at least one pixel. The at least one pixel can have a pixel on-time.

At 610 the laser light from the laser diode can be received at a holographic optical element, which can redirect the laser light towards an eye of a user of the WHUD. At 615, in turn, the laser diode can be modulated during the pixel on-time to be off during a laser off-time of the pixel on-time and on during a laser on-time of the pixel on-time. Such modulation may be controlled by the controller communicatively coupled to the laser diode.

In some implementations, the controller may cause the laser light to be emitted at an increased intensity during the laser on-time. The increased intensity can be greater than a baseline intensity of the laser diode. Moreover, in some implementations a total increased power deliverable by the laser diode during the laser on-time can be about equal to a total baseline power deliverable by the laser diode during the pixel on-time.

Furthermore, in some implementations method 600 can further comprise detecting an angle of the laser light redirected by the holographic optical element by an angle detector carried by the WHUD, and increasing the laser off-time by the controller if the angle deviates from a target angle or a range of target angles.

In addition, in some implementations method 600 can further comprise detecting, by a wavelength detector carried by the WHUD, a wavelength of the laser light emitted by the laser diode, and increasing the laser off-time by the controller if the wavelength deviates from a target wavelength or a range of target wavelengths.

In alternative implementations certain acts may be omitted and/or additional acts may be added to the methods described herein. Furthermore, the illustrated order of the acts is shown for exemplary purposes only and may change in alternative implementations of the methods described herein.

In general, the methods described herein can include performing the functionality and providing the features of the WHUDs and the other devices and systems described herein. Similarly, the devices and systems described herein can perform the functionality and provide the features of the methods described herein.

Throughout this specification and the appended claims the term "communicative" as "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Moreover, throughout this specification and the appended claims, infinitive verb forms are often used. Examples include, without limitation: "to detect," "to provide," "to generate," "to modulate," "to redirect," "to receive," and the like. Unless the specific context requires otherwise, such infinitive verb forms are used in an open, inclusive sense, that is as "to, at least, detect," to, at least, provide," "to, at least, generate," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to US Patent Publication No. 2017-0068095, are incorporated herein by reference, in their entirety. Aspects of the implementations can be modified, if necessary, to employ systems, circuits and concepts of the various patents, applications and publications to provide yet further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A wearable heads-up display comprising:
  a laser projector to generate a display image comprising a pixel having a pixel on-time, the laser projector comprising a laser diode to emit laser light;
  a controller communicatively coupled to the laser diode, the controller communicatively coupled and operable to modulate the laser diode to be turned on and off during a first period of the pixel on-time, the first period of the pixel on-time includes a laser on-time during which the laser diode is on and includes a laser off-time during which the laser diode is off, the controller is operable to set a power output by the laser diode during the laser on-time based on a total baseline power deliverable by the laser diode at a baseline intensity during the pixel on-time, the total baseline power is greater than zero, and the baseline intensity is greater than zero; and
  a holographic optical element to receive the laser light from the laser projector and redirect the laser light towards an eye of a user of the wearable heads-up display.

2. The wearable heads-up display of claim 1, wherein the controller is further operable to control the laser diode to emit laser light at an increased intensity during the laser on-time, the increased intensity greater than the baseline intensity of the laser diode.

3. The wearable heads-up display of claim 2, wherein a total increased power deliverable by the laser diode during the laser on-time is about equal to the total baseline power deliverable by the laser diode at the baseline intensity during the first period of the pixel on-time.

4. The wearable heads-up display of claim 1, wherein the controller is further operable to cycle the laser diode between being on and being off at least twice during the first period of the pixel on-time.

5. The wearable heads-up display of claim 1, wherein the controller is further communicatively coupled and operable to receive a measure of an angle of the laser light redirected by the holographic optical element.

6. The wearable heads-up display of claim 5, further comprising a detector to detect the angle of the laser light redirected by the holographic optical element.

7. The wearable heads-up display of claim 5, wherein the controller is further operable to increase the laser off-time if the angle deviates from a target angle.

8. The wearable heads-up display of claim 1, wherein the controller is further communicatively coupled and operable to receive a measure of a wavelength of the laser light emitted by the laser diode.

9. The wearable heads-up display of claim 8, further comprising a detector to detect the wavelength of the laser light emitted by the laser diode.

10. The wearable heads-up display of claim 8, wherein the controller is further operable to increase a duration of the laser off-time if the wavelength deviates from a target wavelength.

11. The wearable heads-up display of claim 1, wherein the wearable heads-up display comprises glasses and the holographic optical element is disposed on or in a lens of the glasses.

12. The wearable heads-up display of claim 1, wherein the laser projector comprises a scanning laser projector.

13. The wearable heads-up display of claim 12, wherein
  the scanning laser projector comprises a movable scan mirror to direct the laser light towards the holographic optical element; and
  the controller is further operable to position the scan mirror to direct the laser light towards a region of the holographic optical element corresponding to the pixel for a duration of the first period of the pixel on-time.

14. The wearable heads-up display of claim 13, wherein the pixel on-time corresponds to a time taken for the scan mirror to undergo an angular movement corresponding to a spatial dimension of the pixel.

15. A method of operating a wearable heads-up display, the method comprising:
  emitting laser light by a laser diode, the laser light to generate a display image comprising a pixel having a pixel on-time;
  receiving the laser light from the laser diode by a holographic optical element, the holographic optical element to redirect the laser light towards an eye of a user of the wearable heads-up display; and
  modulating, by a controller communicatively coupled to the laser diode, the laser diode to be turned on and off during a first period of the pixel on-time, wherein the first period of the pixel on-time includes a laser on-time during which the laser diode is on and includes a laser off-time during which the laser diode is off, the controller is operable to set a power output by the laser diode during the laser on-time based on a total baseline power deliverable by the laser diode at a baseline intensity during the first period of the pixel on-time, wherein the total baseline power is greater than zero, and the baseline intensity is greater than zero.

16. The method of claim 15, wherein modulating the laser diode by the controller includes causing, by the controller, the laser diode to emit the laser light at an increased intensity during the laser on-time, the increased intensity greater than the baseline intensity of the laser diode.

17. The method of claim 16, wherein modulating the laser diode by the contoller includes causing, by the controller, the laser diode to deliver a total increased power during the laser on-time that is about equal to the total baseline power deliverable by the laser diode during the first period of the pixel on-time.

18. The method of claim 15, further comprising:
detecting, by an angle detector, an angle of the laser light redirected by the holographic optical element; and
increasing the laser off-time if the angle deviates from a target angle.

19. The method of claim 15, further comprising:
detecting, by a wavelength detector, a wavelength of the laser light emitted by the laser diode; and
increasing the laser off-time if the wavelength deviates from a target wavelength.

20. The method of claim 15, further comprising:
receiving the laser light from the laser diode at a movable scan mirror operable to direct the laser light towards the holographic optical element; and
wherein the first period of the pixel on-time corresponds to a time taken for the scan mirror to undergo an angular movement corresponding to a spatial dimension of the pixel.

* * * * *

UNITED STATES PATENT AND TRADEMARK OFFICE
CERTIFICATE OF CORRECTION

PATENT NO. : 11,143,861 B2
APPLICATION NO. : 16/508850
DATED : October 12, 2021
INVENTOR(S) : Stuart James Myron Nicholson It is certified that error appears in the above-identified patent and that said Letters Patent is hereby corrected as shown below:

In the Claims

Column 13 Line 54, Claim 1 insert --wherein-- after "on-time," and before "the"

Signed and Sealed this
Seventh Day of March, 2023

*Katherine Kelly Vidal*

Katherine Kelly Vidal
*Director of the United States Patent and Trademark Office*